US008605697B2

(12) United States Patent
Kuo et al.

(10) Patent No.: US 8,605,697 B2
(45) Date of Patent: *Dec. 10, 2013

(54) ON-DEMAND SERVICES BY WIRELESS BASE STATION VIRTUALIZATION

(75) Inventors: Ted Tsei Kuo, Palo Alto, CA (US); Ming-Jye Sheu, San Jose, CA (US); Tian-Yuan Lin, Fremont, CA (US); Tyan-Shu Jou, Fremont, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 13/191,383

(22) Filed: Jul. 26, 2011

(65) Prior Publication Data

US 2011/0281609 A1      Nov. 17, 2011

Related U.S. Application Data

(63) Continuation of application No. 11/607,619, filed on Dec. 1, 2006, now Pat. No. 8,009,644.

(60) Provisional application No. 60/741,184, filed on Dec. 1, 2005.

(51) Int. Cl.
*H04W 4/00* (2009.01)
(52) U.S. Cl.
USPC ............................ 370/338; 370/328; 455/439
(58) Field of Classification Search
USPC .................................. 370/338; 455/433, 439
See application file for complete search history.

(56) References Cited

U.S. PATENT DOCUMENTS

| 4,176,356 | A | 11/1979 | Foster |
|---|---|---|---|
| 4,193,077 | A | 3/1980 | Greenberg |
| 4,253,193 | A | 2/1981 | Kennard |
| 4,305,052 | A | 12/1981 | Baril |
| 4,513,412 | A | 4/1985 | Cox |
| 4,814,777 | A | 3/1989 | Monser |
| 5,097,484 | A | 3/1992 | Akaiwa |
| 5,173,711 | A | 12/1992 | Takeuchi |
| 5,203,010 | A | 4/1993 | Felix |

(Continued)

FOREIGN PATENT DOCUMENTS

| CN | 1708162 | 12/2005 |
|---|---|---|
| CN | 1316862 | 10/2011 |

(Continued)

OTHER PUBLICATIONS

Extended European Search Report for EP application No. 07755678.5 mailed Dec. 29, 2011.

(Continued)

*Primary Examiner* — Jinsong Hu
*Assistant Examiner* — Nathan Taylor
(74) *Attorney, Agent, or Firm* — Lewis Roca Rothgerber LLP

(57) ABSTRACT

Initiating a virtual presence at a physical access point in response to a request for a service from a wireless access device is provided. A particular wireless service may be provided to a subscriber on an on-demand basis according to location and/or type of service requested. The service may be terminated when demand for the service comes to an end whereby a common wireless service infrastructure may be shared amongst service providers thus eliminating the need for radio channel coordination and otherwise enhancing service quality for those service providers.

21 Claims, 5 Drawing Sheets

(56) References Cited

U.S. PATENT DOCUMENTS

| | | |
|---|---|---|
| 5,220,340 A | 6/1993 | Shafai |
| 5,373,548 A | 12/1994 | McCarthy |
| 5,507,035 A | 4/1996 | Bantz |
| 5,559,800 A | 9/1996 | Mousseau |
| 5,754,145 A | 5/1998 | Evans |
| 5,767,809 A | 6/1998 | Chuang |
| 5,802,312 A | 9/1998 | Lazaridis |
| 5,964,830 A | 10/1999 | Durett |
| 6,034,638 A | 3/2000 | Thiel |
| 6,094,177 A | 7/2000 | Yamamoto |
| 6,266,528 B1 | 7/2001 | Farzaneh |
| 6,292,153 B1 | 9/2001 | Aiello |
| 6,307,524 B1 | 10/2001 | Britain |
| 6,317,599 B1 | 11/2001 | Rappaport |
| 6,326,922 B1 | 12/2001 | Hegendoerfer |
| 6,337,628 B2 | 1/2002 | Campana |
| 6,337,668 B1 | 1/2002 | Ito |
| 6,339,404 B1 | 1/2002 | Johnson |
| 6,345,043 B1 | 2/2002 | Hsu |
| 6,356,242 B1 | 3/2002 | Ploussios |
| 6,356,243 B1 | 3/2002 | Schneider |
| 6,356,905 B1 | 3/2002 | Gershman |
| 6,377,227 B1 | 4/2002 | Zhu |
| 6,392,610 B1 | 5/2002 | Braun |
| 6,404,386 B1 | 6/2002 | Proctor |
| 6,407,719 B1 | 6/2002 | Ohira |
| 6,442,507 B1 | 8/2002 | Skidmore |
| 6,445,688 B1 | 9/2002 | Garces |
| 6,493,679 B1 | 12/2002 | Rappaport |
| 6,498,589 B1 | 12/2002 | Horii |
| 6,499,006 B1 | 12/2002 | Rappaport |
| 6,507,321 B2 | 1/2003 | Oberschmidt |
| 6,625,454 B1 | 9/2003 | Rappaport |
| 6,674,459 B2 | 1/2004 | Ben-Shachar |
| 6,701,522 B1 | 3/2004 | Rubin |
| 6,725,281 B1 | 4/2004 | Zintel |
| 6,753,814 B2 | 6/2004 | Killen |
| 6,762,723 B2 | 7/2004 | Nallo |
| 6,772,331 B1 | 8/2004 | Hind et al. |
| 6,779,004 B1 | 8/2004 | Zintel |
| 6,807,577 B1 | 10/2004 | Gillespie |
| 6,819,287 B2 | 11/2004 | Sullivan |
| 6,876,280 B2 | 4/2005 | Nakano |
| 6,888,504 B2 | 5/2005 | Chiang |
| 6,888,893 B2 | 5/2005 | Li |
| 6,892,230 B1 | 5/2005 | Gu |
| 6,906,678 B2 | 6/2005 | Chen |
| 6,910,068 B2 | 6/2005 | Zintel |
| 6,924,768 B2 | 8/2005 | Wu |
| 6,931,429 B2 | 8/2005 | Gouge |
| 6,941,143 B2 | 9/2005 | Mathur |
| 6,947,727 B1 | 9/2005 | Brynielsson |
| 6,950,019 B2 | 9/2005 | Bellone |
| 6,950,523 B1 | 9/2005 | Brickell |
| 6,961,028 B2 | 11/2005 | Joy |
| 6,973,622 B1 | 12/2005 | Rappaport |
| 6,975,834 B1 | 12/2005 | Forster |
| 7,034,770 B2 | 4/2006 | Yang |
| 7,043,277 B1 | 5/2006 | Pfister |
| 7,043,633 B1 | 5/2006 | Fink |
| 7,050,809 B2 | 5/2006 | Lim |
| 7,064,717 B2 | 6/2006 | Kaluzni |
| 7,085,814 B1 | 8/2006 | Ghandi |
| 7,089,307 B2 | 8/2006 | Zintel |
| 7,127,234 B2 | 10/2006 | Ishii |
| 7,130,895 B2 | 10/2006 | Zintel |
| 7,171,475 B2 | 1/2007 | Weisman |
| 7,181,620 B1 | 2/2007 | Hur |
| 7,197,297 B2 | 3/2007 | Myles |
| 7,234,063 B1 | 6/2007 | Baugher |
| 7,234,156 B2 | 6/2007 | French |
| 7,421,578 B1 | 9/2008 | Huang |
| 7,477,894 B1 * | 1/2009 | Sinha .................. 455/432.1 |
| 7,505,434 B1 * | 3/2009 | Backes .................. 370/331 |
| 7,562,385 B2 | 7/2009 | Thione |
| 7,565,529 B2 | 7/2009 | Beck |
| 7,599,380 B2 | 10/2009 | Whitten |
| 7,669,232 B2 | 2/2010 | Jou |
| 7,722,502 B2 | 5/2010 | Holkkola |
| 7,788,703 B2 | 8/2010 | Jou |
| 7,966,497 B2 | 6/2011 | Gantman et al. |
| 8,005,459 B2 | 8/2011 | Balsillie |
| 8,009,644 B2 | 8/2011 | Kuo |
| 8,091,120 B2 | 1/2012 | Perrella et al. |
| 8,272,036 B2 | 9/2012 | Jou |
| 2002/0009199 A1 | 1/2002 | Ala-Laurila |
| 2002/0022483 A1* | 2/2002 | Thompson et al. ........... 455/439 |
| 2002/0031130 A1 | 3/2002 | Tsuchiya |
| 2002/0047800 A1 | 4/2002 | Proctor |
| 2002/0080767 A1 | 6/2002 | Lee |
| 2002/0084942 A1 | 7/2002 | Tsai |
| 2002/0105471 A1 | 8/2002 | Kojima |
| 2002/0112058 A1 | 8/2002 | Weisman |
| 2002/0158798 A1 | 10/2002 | Chiang |
| 2002/0169966 A1 | 11/2002 | Nyman |
| 2002/0170064 A1 | 11/2002 | Monroe |
| 2003/0026240 A1 | 2/2003 | Eyuboglu |
| 2003/0030588 A1 | 2/2003 | Kalis |
| 2003/0063591 A1 | 4/2003 | Leung |
| 2003/0122714 A1 | 7/2003 | Wannagot |
| 2003/0156558 A1 | 8/2003 | Cromer et al. |
| 2003/0162533 A1 | 8/2003 | Moles |
| 2003/0169330 A1 | 9/2003 | Ben-Shachar |
| 2003/0184490 A1 | 10/2003 | Raiman |
| 2003/0189514 A1 | 10/2003 | Miyano |
| 2003/0189521 A1 | 10/2003 | Yamamoto |
| 2003/0189523 A1 | 10/2003 | Ojantakanen |
| 2003/0191935 A1 | 10/2003 | Ferguson |
| 2003/0196084 A1 | 10/2003 | Okereke |
| 2003/0202486 A1* | 10/2003 | Anton et al. .................. 370/329 |
| 2003/0210207 A1 | 11/2003 | Suh |
| 2003/0227414 A1 | 12/2003 | Saliga |
| 2004/0014432 A1 | 1/2004 | Boyle |
| 2004/0017310 A1 | 1/2004 | Vargas-Hurlston et al. |
| 2004/0017860 A1 | 1/2004 | Liu |
| 2004/0027291 A1 | 2/2004 | Zhang |
| 2004/0027304 A1 | 2/2004 | Chiang |
| 2004/0032378 A1 | 2/2004 | Volman |
| 2004/0036651 A1 | 2/2004 | Toda |
| 2004/0036654 A1 | 2/2004 | Hsieh |
| 2004/0041732 A1 | 3/2004 | Aikawa |
| 2004/0048593 A1 | 3/2004 | Sano |
| 2004/0058690 A1 | 3/2004 | Ratzel |
| 2004/0061653 A1 | 4/2004 | Webb |
| 2004/0070543 A1 | 4/2004 | Masaki |
| 2004/0073786 A1 | 4/2004 | O'Neill |
| 2004/0080455 A1 | 4/2004 | Lee |
| 2004/0095278 A1 | 5/2004 | Kanemoto |
| 2004/0097217 A1 | 5/2004 | McClain |
| 2004/0114535 A1 | 6/2004 | Hoffmann |
| 2004/0121749 A1* | 6/2004 | Cui et al. .................. 455/226.1 |
| 2004/0125777 A1 | 7/2004 | Doyle |
| 2004/0141617 A1* | 7/2004 | Volpano .................. 380/270 |
| 2004/0190477 A1 | 9/2004 | Olson |
| 2004/0203593 A1 | 10/2004 | Whelan |
| 2004/0214570 A1 | 10/2004 | Zhang |
| 2004/0214572 A1* | 10/2004 | Thompson et al. ......... 455/435.2 |
| 2004/0260800 A1 | 12/2004 | Gu |
| 2005/0022210 A1 | 1/2005 | Zintel |
| 2005/0041739 A1 | 2/2005 | Li |
| 2005/0042988 A1 | 2/2005 | Hoek |
| 2005/0074018 A1 | 4/2005 | Zintel |
| 2005/0097503 A1 | 5/2005 | Zintel |
| 2005/0100166 A1 | 5/2005 | Smetters |
| 2005/0135480 A1 | 6/2005 | Li |
| 2005/0138137 A1 | 6/2005 | Encamacion |
| 2005/0138193 A1 | 6/2005 | Encamacion |
| 2005/0152305 A1* | 7/2005 | Ji et al. .................. 370/328 |
| 2005/0165953 A1* | 7/2005 | Oba et al. .................. 709/238 |
| 2005/0180381 A1 | 8/2005 | Retzer |
| 2005/0188193 A1 | 8/2005 | Kuehnel |
| 2005/0220048 A1* | 10/2005 | Lee et al. .................. 370/328 |
| 2005/0228874 A1 | 10/2005 | Edgett |
| 2005/0240665 A1 | 10/2005 | Gu |

(56) References Cited

U.S. PATENT DOCUMENTS

| | | | |
|---|---|---|---|
| 2005/0250472 | A1 | 11/2005 | Silvester |
| 2005/0261970 | A1* | 11/2005 | Vucina et al. ............... 705/16 |
| 2005/0267935 | A1 | 12/2005 | Ghandi et al. |
| 2005/0268107 | A1 | 12/2005 | Harris |
| 2006/0007897 | A1* | 1/2006 | Ishii ........................... 370/338 |
| 2006/0046730 | A1* | 3/2006 | Briancon et al. ............ 455/446 |
| 2006/0052085 | A1 | 3/2006 | Gregorio Rodriguez |
| 2006/0080415 | A1 | 4/2006 | Tu |
| 2006/0080741 | A1 | 4/2006 | Nair |
| 2006/0089123 | A1 | 4/2006 | Frank |
| 2006/0094371 | A1 | 5/2006 | Nguyen |
| 2006/0094400 | A1* | 5/2006 | Beachem et al. ............ 455/410 |
| 2006/0098607 | A1 | 5/2006 | Zeng |
| 2006/0123124 | A1 | 6/2006 | Weisman |
| 2006/0123125 | A1 | 6/2006 | Weisman |
| 2006/0123455 | A1 | 6/2006 | Pai |
| 2006/0133405 | A1* | 6/2006 | Fee ............................. 370/437 |
| 2006/0165103 | A1* | 7/2006 | Trudeau et al. ............. 370/401 |
| 2006/0168159 | A1 | 7/2006 | Weisman |
| 2006/0184660 | A1 | 8/2006 | Rao |
| 2006/0184661 | A1 | 8/2006 | Weisman |
| 2006/0184693 | A1 | 8/2006 | Rao |
| 2006/0189298 | A1 | 8/2006 | Marcelli |
| 2006/0223527 | A1* | 10/2006 | Lee et al. ................... 455/432.2 |
| 2006/0224690 | A1 | 10/2006 | Falkenburg |
| 2006/0225107 | A1 | 10/2006 | Seetharaman |
| 2006/0227761 | A1 | 10/2006 | Scott |
| 2006/0239369 | A1 | 10/2006 | Lee |
| 2006/0291434 | A1 | 12/2006 | Gu |
| 2007/0027622 | A1 | 2/2007 | Cleron |
| 2007/0047449 | A1 | 3/2007 | Berger et al. |
| 2007/0130456 | A1 | 6/2007 | Kuo |
| 2007/0135167 | A1 | 6/2007 | Liu |
| 2007/0143832 | A1 | 6/2007 | Perrella |
| 2007/0150736 | A1 | 6/2007 | Cukier |
| 2007/0189537 | A1 | 8/2007 | Zhang |
| 2007/0199053 | A1 | 8/2007 | Sandhu |
| 2007/0211659 | A1 | 9/2007 | Li |
| 2007/0249324 | A1 | 10/2007 | Jou |
| 2007/0287450 | A1 | 12/2007 | Yang |
| 2007/0294528 | A1 | 12/2007 | Shoji |
| 2008/0119165 | A1 | 5/2008 | Mittal |
| 2008/0307515 | A1 | 12/2008 | Drokov |
| 2009/0013210 | A1 | 1/2009 | McIntosh et al. |
| 2009/0092255 | A1 | 4/2009 | Jou |
| 2009/0193118 | A1 | 7/2009 | Cox et al. |
| 2011/0055898 | A1 | 3/2011 | Jou |
| 2011/0271111 | A1 | 11/2011 | Frank et al. |
| 2012/0278654 | A1 | 11/2012 | Shen |
| 2012/0317625 | A1 | 12/2012 | Jou |

FOREIGN PATENT DOCUMENTS

| | | |
|---|---|---|
| EP | 0352787 | 7/1989 |
| EP | 0534612 | 3/1993 |
| EP | 1315311 | 5/2003 |
| EP | 1450521 | 8/2004 |
| EP | 1608108 | 12/2005 |
| EP | 1638261 | 3/2006 |
| EP | 1724691 | 11/2006 |
| JP | 3038933 | 7/1989 |
| JP | 2008088633 | 2/1996 |
| JP | 2001/057560 | 2/2002 |
| JP | 2005/354249 | 12/2005 |
| JP | 2006/060408 | 3/2006 |
| WO | 0184323 | 11/2001 |
| WO | 02/25967 | 3/2002 |
| WO | 03/079484 | 9/2003 |

OTHER PUBLICATIONS

Chinese Office Action for CN application No. 200780019389.2 mailed Feb. 27, 2012.
Extended European Search Report for EP application No. 06838713.3 mailed Jul. 13, 2011.
Aboba, Bernard. "Virtual Access Points." IEEEP802.11 Wireless LANs, XX, XX, No. 802.11-03/154rl, May 22, 2003, pp. 1-13. XP002425027.
Akyildiz, Ian F. et al. "A Virtual Topology Based Routing Protocol for Multihop Dynamic Wireless Networks," Broadband and Wireless Networking Lab, School of Electrical and Computer Engineering, Georgia Institute of Technology. Date.
Alimian, Areg et al. "Analysis of Roaming Techniques," doc.:IEEE 802.11-04/0377r1, Submission, Mar. 2004.
Calhoun, Pat et al. "802.11r strengthens wireless voice." Technology Update, Network World, Aug. 22, 2005. http://www.networkworld.com/news/tech/2005/082208techupdate.html.
Chang, Nicholas B. et al. "Optimal Channel Probing and Transmission Scheduling for Opportunistics Spectrum Access." Sep. 2007.
Cisco Systems. "Cisco Aironet Access Point Software Configuration Guide: Configuring Filters and Quality of Service." Aug. 2003.
Dell, Inc. "How Much Broadcast and Multicast Traffic Should I Allow in my Network," PowerConnect Application Note #5, Nov. 2003.
Dunkels, Adam et al. "Connecting Wireless Sensornets with TCO/IP Networks." Proc. Of the 2d Int'l Conf. on Wired Networks, Frankfurt, Feb. 2004.
Dunkels, Adam et al. "Making TCP/IP Viable for Wireless Sensor Networks." Proc. Of the 1st Euro. Workshop on Wireless Sensor Networks, Berlin, Jan. 2004.
Dutta, Ashutosh et al. "MarconiNet Supporting Streaming Media Over Localized Wireless Multicast." Proc. Of the 2d Int'l Workshop on Mobile Commerce, 2002.
Festag, Andreas. "What is MOMBASA?" Telecommunication Networks Group (TKN), Technical University of Berlin, Mar. 7, 2002.
Golmie, Nada. "Coexistence in Wireless Networks: Challenges and System-Level Solutions in the Unlicensed Bands." Cambridge University Press, 2006.
Hewlett Packard. "HP ProCurve Networking: Enterprise Wireless LAN Networking and Mobility Solutions." 2003.
Hirayama, Koji et al. "Next-Generation Mobile-Access IP Network," Hitachi Review, vol. 49, No. 4, 2000.
Information Society Technologies Ultrawaves, "System Concept/Architecture Design and Communication Stack Requirement Document." Feb. 23, 2004.
Keidl et al. TES2003, LNCS v. 2819, pp. 104-118. Sep. 2003.
Mawa, Rakesh. "Power Control in 3G Systems," Hughes Systique Corporation. Jun. 28, 2006.
Microsoft Corporation. "IEEE 802.22 Networks and Windows XP," Windows Hardware Developer Central, Dec. 4, 2001.
Park, Vincent et al. "A Performance Comparison of the Temporally-Ordered Routing Algorithm and Ideal Link-State Routing," IEEE, Jul. 1998, pp. 592-598.
Steger, Christopher et al. "Performance of IEEE 802.11b Wireless LAN in an Emulated Mobile Channel." 2003.
Tang, Ken et al. "MAC Layer Broadcast Support in 802.11 Wireless Networks," Computer Science Department, University of California, Los Angeles, 2000 IEEE, pp. 544-548.
Tang, Ken et al. "MAC Reliable Broadcast in Ad Hoc Networks," Computer Science Department, University of Califonia, Los Angeles, 2001 IEEE, pp. 1008-1013.
Toskala, Antti. "Enhancement of Broadcast and Introduction of Multicast Capabilities in RAN," Nokia Networks, Palm Springs, CA, Mar. 13-16, 2001.
Tsunekawa, Kouichi. "Diversity Antenna for Portable Telephones." 39th IEEE Vehicular Technology Conference, pp. 50-56, vol. 1, Gateway to New Concepts in Vehicular Technology, May 1-3, 1989. San Francisco, CA.
Wennstrom, Mattias et al. "Transmit Antenna Diversity in Ricean Fading MIMO Channels with Co-Channel Interference." 2001.
PCT Application No. PCT/US2006/045893, International Search Report and Written Opinion Sep. 25, 2007.
PCT Application No. PCT/US2007/09836, International Search Report and Written Opinion Sep. 12, 2008.
PCT Application No. PCT/US2007/09503, International Search Report and Written Opinion Mar. 3, 2008.
PCT Application No. PCT/US2012/036028, International Search Report and Written Opinion Aug. 7, 2012.

(56) References Cited

OTHER PUBLICATIONS

Chinese Office Action for CN Application No. 200680045272.7 mailed Jul. 12, 2011.
Chinese Office Action for CN Application No. 200680045272.7 mailed Feb. 1, 2011.
Chinese Office Action for CN Application No. 200680045272.7 mailed Jul. 15, 2010.
Chinese Office Action for CN Application No. 200780019074.8 mailed Jun. 15, 2011.
Chinese Office Action for CN Application No. 200780019389.2 mailed Sep. 12, 2012.
Chinese Office Action for CN Application No. 200780019389.2 mailed Feb. 14, 2012.
Chinese Office Action for CN Application No. 200780019389.2 mailed Apr. 8, 2011.
European First Examination Report for EP Application No. 068387133 mailed Apr. 3, 2012.
European First Examination Report for EP Application No. 07755678.5 dated Oct. 23, 2012.
U.S. Appl. No. 11/607,619, Office Action mailed Oct. 13, 2010.
U.S. Appl. No. 11/607,619, Final Office Action mailed Dec. 4, 2009.
U.S. Appl. No. 11/607,619, Office Action mailed Apr. 29, 2009.
U.S. Appl. No. 11/788,371, Final Office Action mailed Jan. 21, 2010.
U.S. Appl. No. 11/788,371, Office Action mailed Sep. 17, 2009.
U.S. Appl. No. 11/789,446, Final Office Action mailed Oct. 13, 2010.
U.S. Appl. No. 11/789,446, Office Action mailed May 24, 2010.
U.S. Appl. No. 11/789,446, Final Office Action mailed Jun. 24, 2009.
U.S. Appl. No. 11/789,446, Office Action mailed Sep. 3, 2008.
U.S. Appl. No. 12/339,688, Office Action mailed Sep. 15, 2009.
U.S. Appl. No. 12/845,089, Final Office Action mailed Feb. 14, 2012.
U.S. Appl. No. 12/845,089, Office Action mailed Sep. 6, 2011.
U.S. Appl. No. 13/461,679, Office Action mailed Apr. 1, 2013.
U.S. Appl. No. 13/590,997, Office Action mailed Jul. 18, 2013.
U.S. Appl. No. 13/461,679, Final Office Action mailed Oct. 25, 2013.

* cited by examiner

ON-DEMAND SERVICES BY WIRELESS BASE STATION VIRTUALIZATION

CROSS-REFERENCE TO RELATED APPLICATIONS

This application is a continuation of U.S. patent application Ser. No. 11/607,619, filed Dec. 1, 2006, which claims the priority benefit of U.S. provisional patent application 60/741,184 filed Dec. 1, 2005 and entitled "Methods and Apparatus to Offer On-Demand Services and On-Demand Access Methods over Wireless Networks by Wireless Base Station Virtualization," the disclosure of both are incorporated herein by reference.

BACKGROUND

1. Field of the Invention

The present invention relates generally to wireless communications and more specifically to wireless base station virtualization.

2. Description of the Related Art

An access point is a transmitter/receiver device that communicates data with one or more remote receiving nodes over a wireless link. An access point may include a wireless base station (WBS) that provides series of wireless access devices (WADs)—such as an IEEE 802.11 or IEEE 802.16e Network Interface Card (NIC) or IEEE 802.16 Customer Premises Equipment (CPE)—access to a wireless network. The terms "WBS" and "access point" may be used interchangeably throughout the present disclosure. The wireless network may be, for example, an IEEE 802.11 or IEEE 802.16 network. Prior art access points broadcast beacon frames for receipt by WADs to indicate that a wireless service is available. Further, WADs configured to access a wireless network may broadcast service request frames to solicit services from wireless networks in the area. An example of a service request frame includes a probe request frame as described in the IEEE 802.11 wireless standard, the disclosure of which is incorporated herein by reference.

Prior art access points are generally limited to providing a small number of services. The number of provided services is limited, in part, by the combined length of the beacon frames generated by the access point. Each provided service is identified within a beacon frame by a Service Set Identifier (SSID). As more services are provided by an access point, the signal comprising the beacon frames becomes longer. Due, in part, to time limitations and resource constraints at both the access points and WADs, a typical WBS can only advertise, and thus provide, up to eight to sixteen services. The time limitations are due to required gaps between the beacon frames for each of the services. Resource constraints may include consumption of available bandwidth and use of available processing power at the access point. Prior art access points are further limited to providing a fixed and static set of services regardless of geographic location or service usage within the wireless network.

FIG. 1 depicts a controller and access points in a wireless network 100 as may be found in the prior art and exemplifies the problems of static service offerings. The network 100 includes a controller 105 and a series of access points 110A-110N. The controller 105 defines a fixed set of SSIDs associated with each of access points 110A-110N.

Access points 110A-110C may be associated (via controller 105) with the same set of SSIDs (e.g., airespider, aspd, ruckus, v54, linksys, tsunami, 2wire, xlan, wireless, compaq). The access point 110D may be associated (also via controller 105) with a subset of the SSIDs associated with access points 110A-110C. For example, the access points 110A-110C in FIG. 1 are associated with SSIDs for ruckus, v54, linksys, tsunami, 2wire, xlan, wireless, and compaq but access point 110D may only be associated with SSIDs for ruckus and v54. The access point 110D cannot be further associated with additional SSIDs beyond those defined by the controller 105. As a result, the access point 110D may not be associated with SSIDs for linksys, tsunami, 2wire, xlan, wireless, and compaq even though the access point may not be operating at full capacity thus wasting available resources, especially if the access points 110A-110C are overloaded by service requests from WADs.

One solution to the problem of static and limited service offerings has been the use of unlicensed band radio frequencies (RF). This solution, however, risks RF interference from other devices at the deployed environment. The RF interference problem may severely affect service quality at premises where multiple service providers deploy their wireless service networks.

Another solution may be to offer negotiated provider-to-provider channel allocation. Such negotiation may allow for a variety of services but may actually contribute to increased RF interference. Such negotiation may also prove to be tedious and time-consuming amongst providers.

An alternative to the use of unlicensed band RF and negotiated channel allocation is the deployment of a single service provider as is common in, for example, airports and coffee house 'hot spots.' The single provider (e.g., T-Mobile) in such a scenario will generally have exclusive deployment rights to the premises thereby forcing the user of a WAD to subscribe to that provider's service. Such hot spots may be able to provide additional services by mandating a wireless network infrastructure, backhauling the wireless traffic, and differentiating the traffic based on the service provider at the backend. Many locations may not want to establish or maintain the wireless infrastructure, however, due to cost or other limitations.

There is a need for an on-demand wireless service solution. Such a solution will allow for a particular wireless service to be provided to a subscriber in an on-demand basis according to location and/or type of service requested. Such services may then be terminated when demand for the particular service comes to an end. Such a solution would allow for a common wireless service infrastructure to be shared amongst service providers thereby eliminating the need for radio channel coordination and decreasing RF interference and consumption of bandwidth resources. Service quality for all service providers may further be enhanced at a common wireless premises site.

SUMMARY

Embodiments of the present invention allow service providers to offer different types of services to subscribers over deployed wireless networks. Service providers may make these offerings by grouping subscribers based on specified services or access methods without changing WADs or violating various wireless standards. The embodiments described herein may be implemented in, for example, IEEE 802.11 based networks (e.g., Wi-Fi/Wireless Local Area Network (WLAN)) in addition to other network deployments including but not limited to IEEE 802.16 (WiMAX) and IEEE 802.16e-2005 (Mobile WiMAX).

In one exemplary embodiment of the present invention, a method for providing on-demand wireless services is disclosed. Through this exemplary method, a service request is received at a WBS from a WAD. In response to the service request, a virtual presence is initiated at the WBS, if the WBS is configured to or otherwise capable of providing the requested service. A plurality of beacon frames is broadcast by the WBS indicating the availability of the requested service through the virtual presence at the WBS. A wireless service corresponding to the service request is provided to the WAD utilizing the virtual presence of the WBS.

In another embodiment of the present invention, a system for providing on-demand wireless services is disclosed. A WBS receives a service request from a WAD and broadcasts a plurality of beacon frames. The plurality of beacon frames indicates the availability of the requested service via a virtual presence at the WBS. A virtual presence at the WBS is initiated in response to the service request, and provides the requested service to the WAD using that presence.

In yet another embodiment of the present invention, an apparatus is disclosed that may provide on-demand wireless services. The apparatus, which may be implemented as a WBS, receives a service request from a WAD. If the apparatus is configured to or otherwise capable of providing the requested service, the apparatus initiates a virtual presence in response to the service request. The apparatus broadcasts a plurality of beacon frames indicating the availability of the requested service at the apparatus via the virtual presence. The apparatus then provides the WAD with a wireless service corresponding to the service requests utilizing the aforementioned virtual presence initiated at the apparatus.

A still further embodiment of the present invention provides a computer-readable medium. Embodied on the medium are one or more programs. The one or more programs may be executed by a computing device (e.g., a processor at a WBS) to perform a method for providing on-demand wireless services. Execution of the program may allow for the receipt of a WAD-initiated service request at the computing device executing the one or more programs. In response to the service request, the one or more programs may provide for the initiation of a virtual presence at the computing device and the broadcast of a plurality of beacon frames indicating the availability of the requested service through the virtual presence. The one or more programs may then allow for a wireless service corresponding to the service request to be provided to the requesting WAD utilizing the aforementioned virtual presence.

DETAILED DESCRIPTION

A system, method, apparatus, and computer-readable medium for initiating a virtual presence at a physical access point in response to a request for a service from a WAD is provided. As a result, a particular wireless service may be provided to a subscriber on an on-demand basis according to location and/or type of service requested notwithstanding the aforementioned limitations of the prior art. The service may then be terminated when demand for the service comes to an end. As a result, a common wireless service infrastructure may be shared amongst service providers thereby eliminating the need for radio channel coordination and otherwise enhancing service quality for those service providers at the common wireless premises site.

To overcome the limitations on the number of services that may be provided by a physical access point due to, for example, the length of beacon frames, a virtual presence is initiated by the physical access point in an on-demand fashion. Additional virtual access point presences may be dynamically mapped depending on received service requests from a WAD. Because only the services that have been requested are provided, the access point is able to provide a greater selection of services. Further, the access point presence need only broadcast the beacon frames corresponding to the initiated virtual access points thereby reducing interference between the services and preserving network bandwidth. The method may also be implemented with respect to wireless access methods such as security policies or authentication schemes.

By dynamically binding services with a virtual presence in a WBS upon the request of subscribers who demand the services, a WBS may provide N services out of M services. In this equation, N is the maximum active instances in a WBS at any given time and M is the total number of services a provider offers (M.gtoreq.N.gtoreq.1). Thus, at any given time, there may be different N subset of M services offered to subscribers by different WBS.

Figure 1:
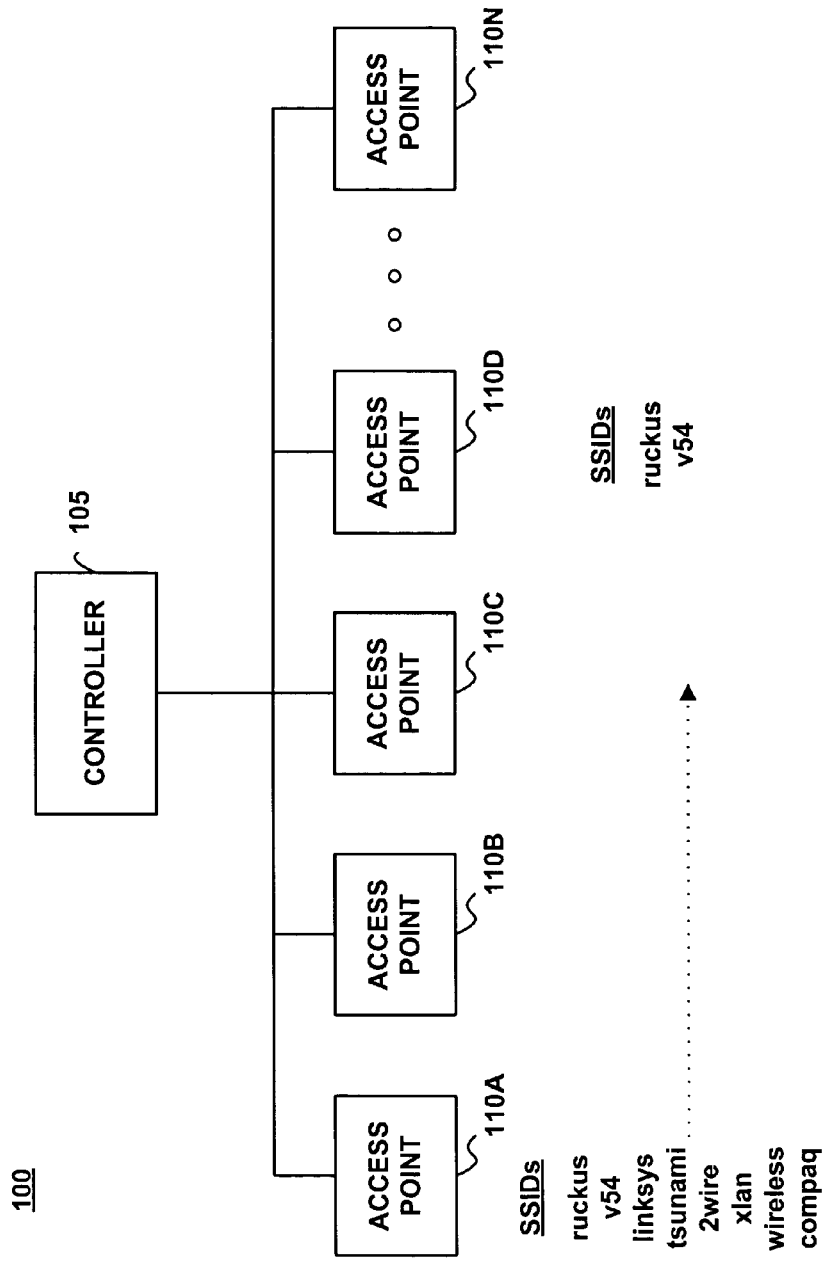
FIG. 1 depicts a controller and access points in a wireless network as may be found in the prior art.
Figure 2:
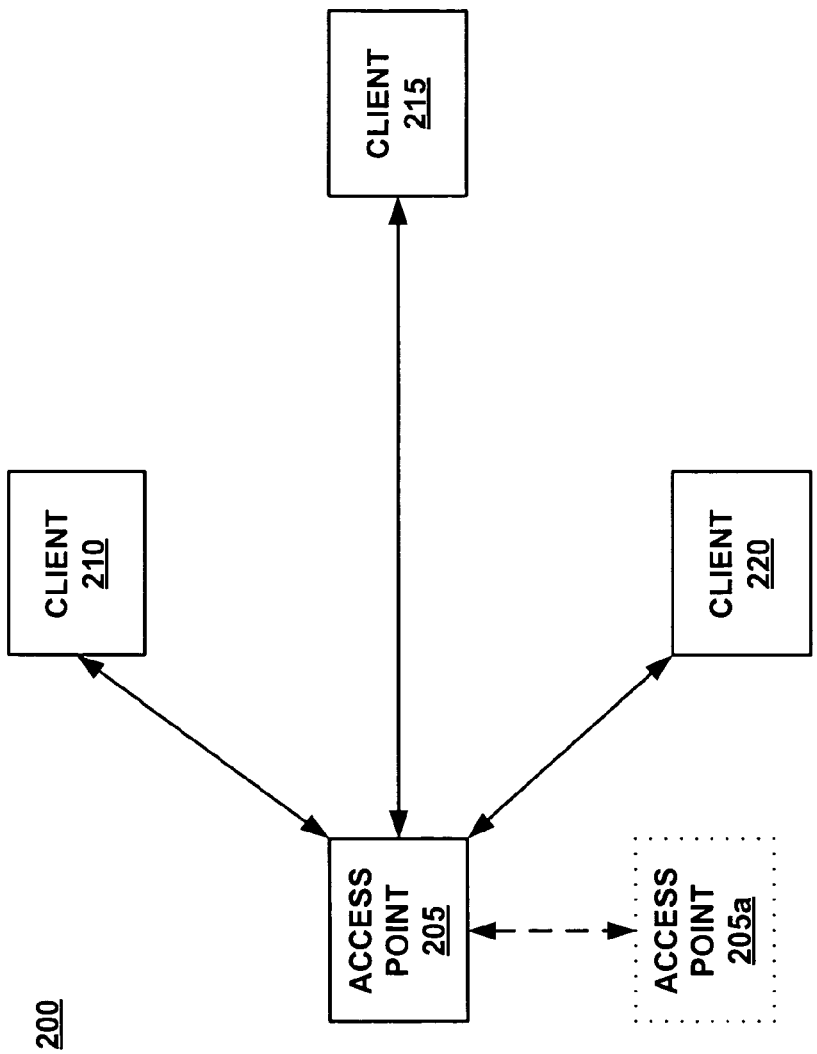
FIG. 2 depicts an exemplary wireless communication network offering on-demand service through access point virtualization according to an embodiment of the present invention.

FIG. 2 depicts an exemplary wireless communication network 200 offering on-demand service through access point virtualization according to an embodiment of the present invention. The network 200 comprises an access point (WBS) 205 and one or more WADs such as wireless clients 210, 215, and 220. The wireless clients 210-220 may communicate with the access point 205 via any variety of wireless networks such as an IEEE 802.11 network and/or an IEEE 802.16 network.

The access point 205 is capable of advertising services and allowing subscribers to access a wireless network according to a service policy. The access point 205 may initiate one or more virtual presences in accordance with an embodiment of the invention like the methods described in the context of FIGS. 3 and 5. The access point 205 in FIG. 2 is configured to access a service list indicating a plurality of services, which may be referred to as valid services in that the access point 250 may offer those services to a requesting subscriber. The valid services may include various wireless services provided by service providers such as T-Mobile, Verizon Wireless, Sprint, AT&T, and the like. The functionality of the access point 205 may be distributed over one or more other physical devices such as access point 205a.

The exemplary access point 205 may include hardware such as a modulator/demodulator (modem), antenna, processor, and memory. The modem may be configured to receive data from a router connected to the Internet and convert the data into a modulated RF signal including an 802.11 compliant modulated RF signal. The antenna may communicate the modulated RF signal wirelessly to one or more WADs within a range associated with the access point 205. The antenna may further be configured to receive RF-modulated data from a WAD. The antenna may be responsible for transmission and receipt of beacon frames and service requests, respectively. The processor may be configured to access and process instructions and/or data stored in a memory such as a list of valid services as described above. Instructions in memory may be configured to initiate a virtual presence at the WBS and undertake authentication operations. Quality of service (QoS), security, and roaming instruction sets may also be stored in memory and accessible and executable by the processor.

Clients 210, 215, and 220 (as noted earlier) are exemplary of any variety of WADs such as an IEEE 802.11 or IEEE 802.16e NIC, and IEEE 802.16 CPE. Client WADs 210-220 may be embodied in other equipment such as a laptop computer, smart phone, and the like. Client WADs 210-220 of FIG. 2 broadcast service requests with a desired SSID or other identifier regardless of whether a local WBS, such as access point 205, actually advertises the availability of the desired service. The service requests may be broadcast according to a relevant wireless network standard such that embodiments of the present invention need not change user behavior.

Figure 3:
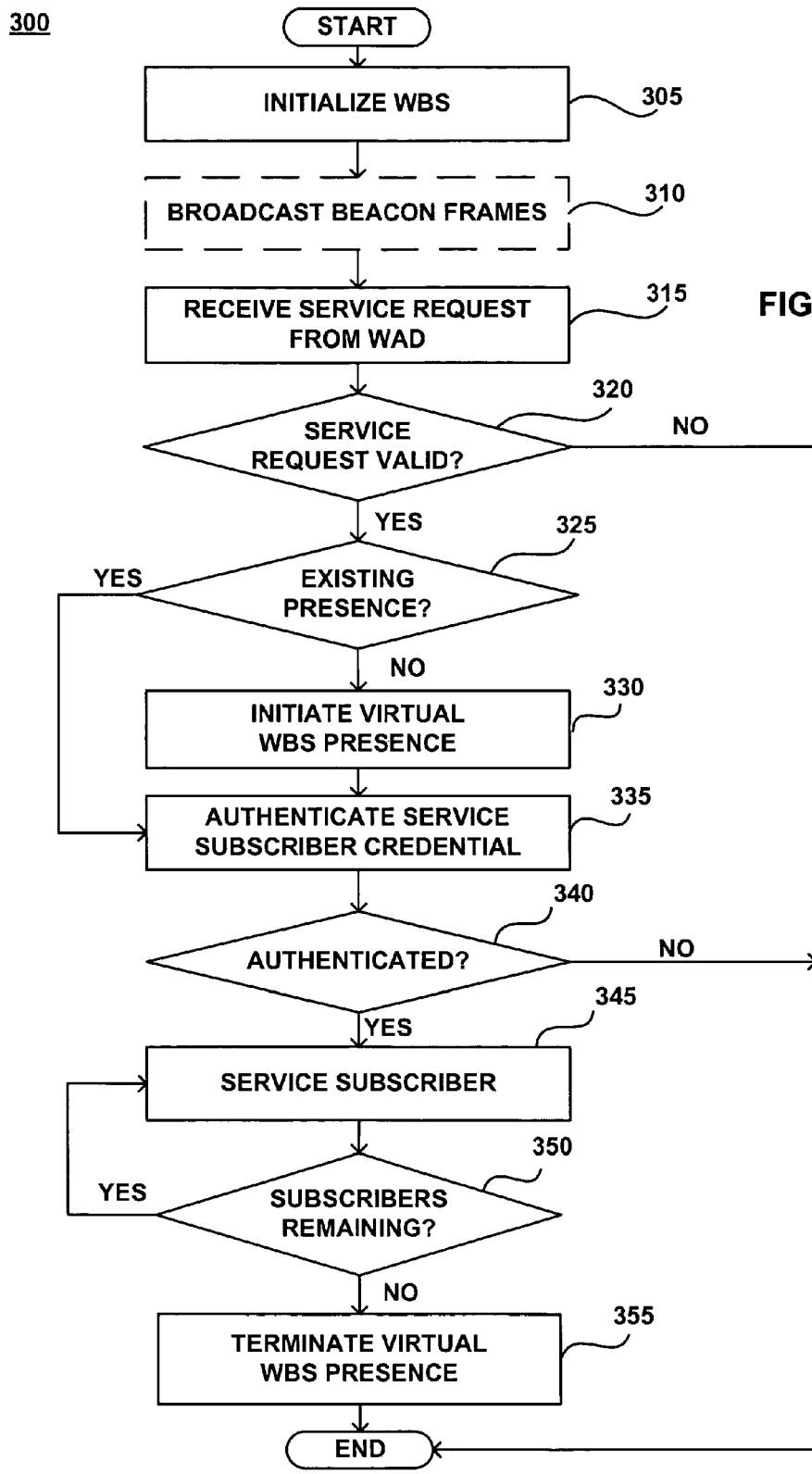
FIG. 3 depicts an exemplary method for providing on-demand service through access point virtualization according to an embodiment of the present invention.

As will be detailed in FIG. 3, upon receipt of a service request from, for example, WAD client 210, the access point 205 will determine whether the requested service is a valid service (e.g., is the requested service provided by the access point 205). If so, the access point 205 will begin broadcasting a plurality of beacon frames indicating the availability of that service to attend to that request. The WAD client 210 may then negotiate with the access point 205 (e.g., authentication) such that the WAD may access the desired service at an access point 205 via a virtual presence, as discussed herein.

FIG. 3 depicts an exemplary method 300 for providing on-demand service through access point virtualization according to an embodiment of the present invention. The method 300 may be performed by access point 205 and/or access point 205a. In other embodiments, the method 300 may be performed to provide on-demand wireless access methods in, for example, an enterprise environment. The wireless access methods may include subscriber authentication, authorization, data confidentiality, and QoS treatments. The method 300 further provides for terminating a virtual presence at a WBS in the event that no subscribers are presently within the range of the WBS and requesting a particular service associated with the virtual presence.

In step 305, a WBS (such as access point 205) is initialized. Initialization may include entering a RUN state, which may further include the WBS broadcasting beacon frames indicating a network identifier. The network identifier may include an ID associated with the physical wireless network provider, which may be an entity that operates the WBS device. In some embodiments, the WBS may not broadcast the beacon frames indicating a network identifier for the purpose of network security. The network provider may be associated with a particular service provider. As noted in the context of FIG. 2, the WBS functionality may be distributed amongst a group of access points (e.g., access points 205 and 205a) to allow for, for example, redundancy and scalability.

In step 310, the WBS may optionally broadcast one or more beacon frames associated with one or more services. For example, a WBS may broadcast a beacon frame based on a default setting, a service that is frequently accessed via the WBS, or a service associated with an initiated virtual WBS presence on the WBS (access point 205).

In step 315, a service request is received at the WBS from a WAD. Regardless of whether the WBS proactively advertises the availability of a particular service, the WAD will broadcast a service request that may be received by the WBS. The service request indicates a desired service identifier, which may, in turn, indicate a particular service provider. Referring to FIG. 2, WAD client 210 may, for example, broadcast a service identifier for T-Mobile wireless service while WAD client 215 may indicate a unique service identifier indicating the desire for wireless service from Verizon Wireless. The WBS (access point 205) may receive the broadcast service requests of both WAD client 210 and WAD client 215.

In step 320, the WBS determines whether the service request is valid. The WBS may access a service list stored in memory or at a local or remotely accessible database indicating a one or more service identifiers associated with valid services. If the service request is not valid, the method 300 ends without a virtual presence being established at the WBS.

If, however, the service request is valid, the WBS determines whether there is an already existing virtual WBS presence corresponding to the service identifier in step 325. Referring again to FIG. 2, identification of an existing virtual WBS presence may occur if, for example, the Verizon Wireless service request is received from WAD client 210 but WAD client 220 is already connected to a virtual WBS presence via Verizon Wireless. If, however, the service request is received from WAD client 215, which requested T-Mobile service, there may not be an existing virtual WBS presence because no other client has initiated the T-Mobile service through a virtual presence at the WBS.

If there is not an already existing WBS virtual presence, a virtual presence may be initiated by the physical WBS in step 330. The WBS may be capable of providing up to eight to sixteen virtual WBS presences simultaneously although, in some embodiments, the WBS may actually offer valid services in excess of that number. If the WBS is presently offering the maximum number of virtual presences, the WBS may not be able to initiate additional virtual WBS presences. Another nearby WBS may, however, take on the task of initiating and actively providing the additional virtual presence.

When a single WBS has reached a physical limit with respect to offering a virtual presence for a particular service, the WBS may not respond to service requests that do not correspond to an already active virtual presence. The virtual WBS presence may be initiated by the WBS generating or retrieving an SSID associated with the service provider. The WBS may then broadcast a beacon frame associated with the SSID indicating the availability of that service through a virtual WBS presence. Subsequent WADs may access this service via the virtual presence subject to, for example, authentication or other service policies.

If there is an existing virtual WBS presence or the virtual WBS presence has been initiated, the WAD engages in an authentication process according to an authentication policy of the service provider in step 335. The authentication policy may include credentials and privileges associated with the virtual WBS presence.

In step 340, a determination is made as to whether the WAD is authenticated. A WAD may, in some instances, fail an authentication process with the service provider due to, for example, lack of credentials. In some embodiments, to avoid a denial of service (DoS) attack, the virtual WBS presence may be terminated if there is no authenticated WAD within a set period of time after the virtual WBS presence is initiated. This period of time may be a default period or may be configurable by a network or service administrator. If the WAD is not authenticated or the set period of time has expired, the method 300 ends. If the WAD is authenticated, the virtual WBS provides a wireless connection to the WAD and begins servicing the WAD in step 345.

In step 350, while the virtual WBS is present, a determination is made as to whether any subscribing WADs are remaining within range of the WBS. If subscribers are remaining, the virtual WBS presence and service is maintained. If there are no subscribers remaining, the virtual WBS presence may be terminated in step 355. In some embodiments, the virtual WBS presence may be terminated after a period of time has passed if the last subscribing WAD leaves the range of the WBS.

After the virtual WBS presence is terminated, the WBS is able to initiate a new virtual WBS presence. By dynamically assigning SSIDs to the WBS, the WBS can provide services to WADs on-demand. Additionally, by only providing services that are requested, the method 300 reduces the effects of RF interference between devices and WBSs in a wireless network. Bandwidth and processing power that might otherwise be expended on unnecessarily broadcast beacon frames is also preserved.

Figure 4:
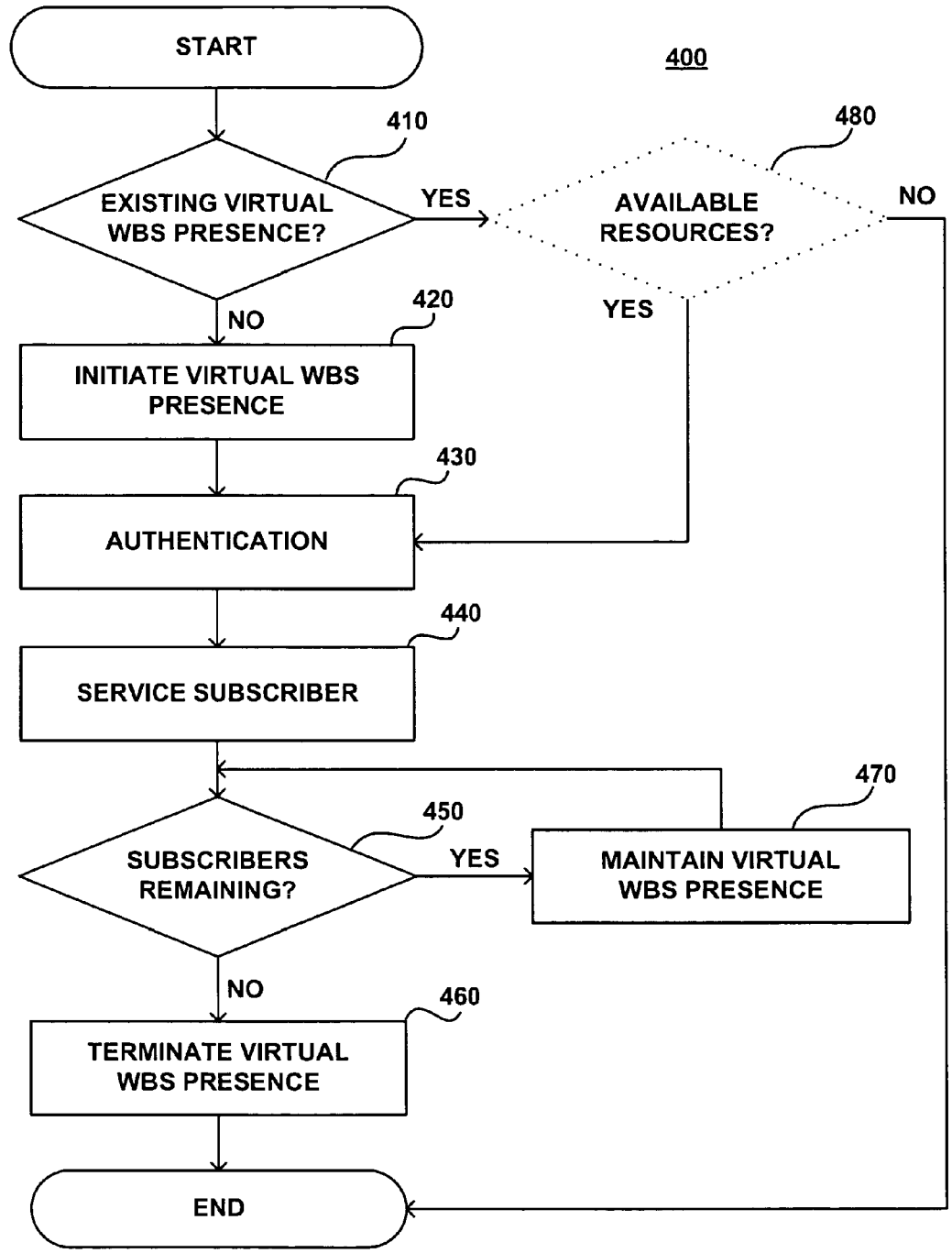
FIG. 4 depicts an exemplary method for roaming amongst wireless base stations in an embodiment of the present invention.

FIG. 4 depicts an exemplary method 400 for roaming amongst WBSs in an embodiment of the present invention. The present invention may allow for roaming of a WAD from one WBS service area to another during a service session. Roaming is inclusive of using a particular WAD outside of a pre-defined 'home' area that may be associated with a particular WBS as well as the general movement of a WAD amongst the service areas provided by a multiplicity of WBSs.

In step 410, a determination is made as to whether there is an existing virtual WBS presence in the service area to where a WAD is preparing to roam. Identification of an existing virtual WBS presence may occur through the WBS broadcasting beacon frames that identify the wireless network provider. The broadcast identity may be a physical network provider or individual service providers. Identification of an existing virtual WBS presence may also occur through the roaming WAD broadcasting a service request for a particular service and a particular WBS broadcasting beacon frames in response to that request.

A determination that a WAD is preparing to roam from the virtual presence of a present WBS (thereby necessitating the determination of step 410) may be indicated by degradation in signal quality between the WAD and the virtual presence of the WBS. At some threshold, which may be configurable, the WAD or WBS may attempt to identify a better WBS virtual presence to associate with the WAD. A threshold indicative of roaming may also be associated with a number of failed retransmission attempts that may be a result of degraded signal quality. In some embodiments, identification of the new WBS virtual presence may include a determination of the 'best available' WBS rather than 'an available' WBS to help ensure the highest quality wireless service session. Both the WAD and the WBS may indicate the need for roaming.

If there is no pre-existing virtual WBS presence identified in step 410, a new virtual WBS presence may be initiated at step 420 as described, for example, in the context of FIG. 3. Like the method described in the context of FIG. 3, if a new virtual presence cannot be initiated (e.g., a service request is not valid), then the method 400 ends and the wireless service may be temporarily interrupted or terminated all together. In some embodiments, the WAD may begin searching for a new WBS to offer the previously accessed service (e.g., the WAD may continue to or attempt to roam).

A WAD that has roamed into the service area of a new WBS and initiated a new virtual presence (step 420) may need to be authenticated at step 430. Authentication (like that described in the context of FIG. 3) at the new WBS may be required to maintain network security. In the case of roaming versus a first initiation of a virtual presence at a WBS, the level of authentication may be reduced (e.g., with respect to wireless switching/controller mechanisms). Reduced authentication may occur through certain authentication information being provided to a new WBS by a previous WBS. Certain authentication information may also be provided through, for example, an authentication token possessed by the WAD following authorization with a first WBS.

Following authentication, the prior WBS 'hands over' the WAD to the new WBS. The WAD is then serviced by the virtual presence of the new WBS in step 440 in a fashion similar to that of FIG. 3. The hand over procedure of the WAD between WBS may accord with those defined in, for example, the IEEE 802.11r and IEEE 802.16e-2005 standards, the disclosures of which are incorporated herein by reference.

In step 450—after the service has been offered to one or more WAD subscribers—a determination is made as to whether there are any WAD subscribers remaining at the virtual presence. This determination may be a configurable period of time, for example, with respect to a last service request for a particular service or initiation of a particular virtual presence. If no WAD subscribers (both the initial and/or subsequent subscribers) are present at or after that expiration of time (e.g., 10 minutes since a service request for a particular service or 20 minutes after the presence was initiated), the WBS resources dedicated to maintaining the associated virtual presence may be freed and that particular presence terminated at step 460. If WAD subscribers remain (as may be determined in accordance with the aforementioned period of time), then the virtual presence is maintained at step 470 and the determination is later repeated at step 450.

Returning to the start of the present method (400), in some instance a particular virtual presence may already exist at a WBS as determined in step 410. In such an instance, an optional determination of available resources may be made with respect to the WBS offering the virtual presence at step 480. For example, a particular service may be offered by the WBS but that WBS may also be hosting several other WADs. While the service may be available, the WBS may have difficulty in accepting a new roaming subscriber WAD and/or maintaining a certain level of service for already existing WADs for that particular service or any other service as may be offered by through a virtual presence at the WBS.

If the resources are available and the WBS may admit and manage the new WAD, then authentication and service may take place in steps 430 and 440, respectively. If the WBS is unable to admit and/or manage the WAD as may be governed by a particular QoS or admission control policy, the new subscriber may be denied and the wireless service may be temporarily interrupted or terminated all together. In some embodiments, the WAD may begin searching for a new WBS to offer the previously accessed service (e.g., the WAD may continue to or attempt to roam).

Figure 5:
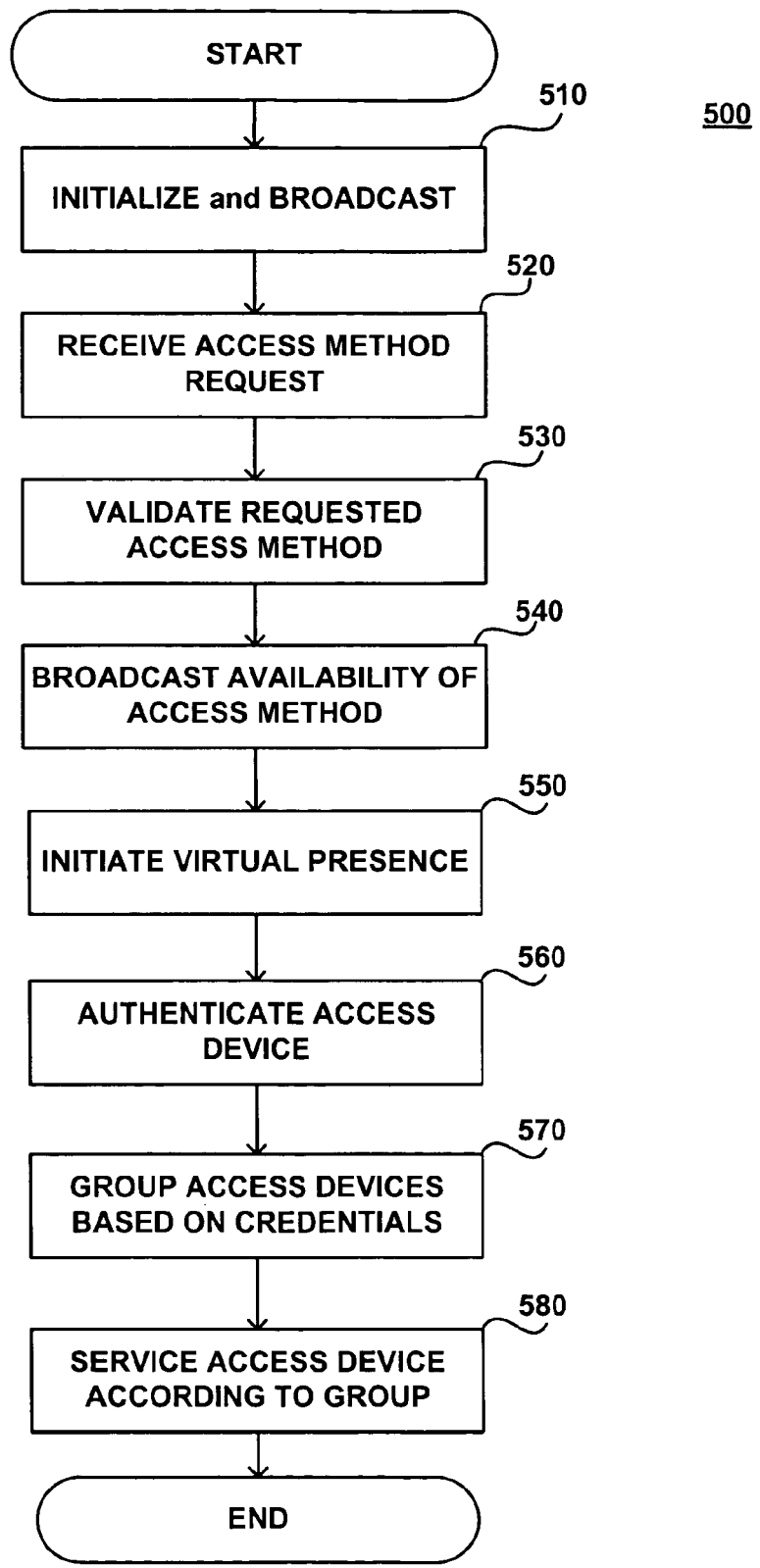
FIG. 5 depicts an exemplary method for providing on-demand wireless access methods through access point virtualization according to an embodiment of the present invention.

FIG. 5 illustrates an exemplary method 500 for providing on-demand wireless services based on subscriber credentials in accordance with an exemplary embodiment of the present invention. As noted above, in some embodiments of the present invention, the WBS may advertise wireless access methods instead of wireless services. The wireless access method broadcast by a WBS may indicate mechanisms for subscriber authentication, authorization, data confidentiality, and QoS treatments over the air interface. In such an embodiment, a service may be offered based on subscriber credentials instead of virtual presence at a WBS associated with a WAD subscriber. The dynamic nature of the WBS virtual presence is used to specify access policies for WAD subscribers whereby once a subscriber is connected to a wireless network infrastructure, the type of services made available to the subscriber are based on the aforementioned subscriber credentials.

In step 510, an access point such as a WBS is initialized and begins broadcasting a default wireless link access method. In step 520, a subscriber WAD may broadcast a request with respect to a preferred wireless access method. The WBS—upon receipt of the WAD request—determines whether the method identified by the WAD is a valid method in step 530. This determination may be similar as to the determination methodology as described in the context of, for example, FIG. 3. In step 540, presuming the requested access method is valid, the WBS may begin broadcasting beacon frames indicative of the availability of the requested access method. The WBS may also initiate a virtual presence at the WBS in step 550 that corresponds to the aforementioned access method.

In step 560, an authentication procedure may take place with respect to the requesting WAD in a fashion similar to that described in the context of, for example, FIGS. 3 and 4. In step 570, once the WAD subscriber has been authenticated and admitted to the network, the WAD is grouped based on its credentials. This credential grouping will determine what wireless services the WAD may access and utilize in step 580 regardless of the access method used by the WAD to enter the network.

As was discussed in the context of, for example, FIGS. 3 and 4, subsequent WADs may be admitted to an already initiated virtual presence at a particular WBS albeit based on a particular access method in the context of FIG. 5 rather than a requested service as was the case in FIGS. 3 and 4. Various determinations may also be made with respect to termination of a particular access methodology after a last subscriber has ended their connection with the WBS. As was the case in the context of FIGS. 3 and 4, the period of time that must elapse before terminations takes place may be adjustable and based on a variety of trigger points. The present methodology further supports roaming of WADs as was discussed in the context of FIG. 4 as well as unavailable method handling and DoS attack prevention.

The above description is illustrative and not restrictive. Many variations of the invention will become apparent to those of skill in the art upon review of this disclosure. Therefore, specific details disclosed herein are not to be interpreted as limiting but rather as an exemplary basis for the claims and as a representative basis for teaching one skilled in the art to employ the present invention in virtually any appropriately detailed system, structure, method, process, or manner.

In that regard, the system identified in FIG. 2 is exemplary and may include various alternatives, equivalents, or derivations thereof. Similarly, the steps identified in FIGS. 3, 4, and 5 (and the order thereof) are exemplary and may include various alternatives, equivalents, or derivations thereof including but not limited to the order of execution of the same. The steps of the aforementioned methods (and their various alternatives) may be embodied in hardware or software including a computer-readable medium (e.g., computer memory, optical disc, or memory card) including programs and/or instructions executable by, for example, the processor of a computing device.

What is claimed is:

1. A method for providing on-demand wireless services, the method comprising:
receiving a request for service from a wireless access device, the request received at a physical wireless base station that provides services within a service area;
determining that no virtual wireless base station presence corresponding to the requested service is currently provided by the physical wireless base station;
initiating a new virtual wireless base station presence at the physical wireless base station, wherein the new virtual wireless base station presence corresponds to the requested service;
broadcasting a plurality of beacon frames that indicate availability of the requested service to one or more other wireless access devices in the service area of the physical wireless base station, whereby the requested service is made available via the new virtual wireless base station presence to the one or more wireless access devices upon subscription; and
terminating the new virtual wireless base station presence after arriving at a determination that no subscribing wireless access device remains within the service area of the physical wireless base station.

2. The method of claim 1, further comprising storing a list of valid services in memory and determining that the requested service corresponds to a valid service on the list prior to initiating the new virtual wireless base station presence.

3. The method of claim 1, further comprising authenticating the wireless access device within a predetermined period of time following receipt of the request and prior to initiating the new virtual wireless base station presence.

4. The method of claim 3, further comprising grouping the wireless access device with a set of available services, the wireless access device grouped according to authentication credentials provided by the wireless access device.

5. The method of claim 1, further comprising determining that the physical wireless base station has not yet reached a maximum number of virtual wireless base station presences prior to initiating the new virtual wireless base station presence.

6. The method of claim 1, wherein the terminated virtual wireless base station presence allows for initiation of another new virtual wireless base station presence corresponding to another requested service.

7. The method of claim 1, further comprising:
identifying a degradation in signal quality between the new virtual wireless base station presence and the wireless access device;
determining that the degraded signal quality is less than the signal quality of another virtual wireless base station presence; and
transitioning the wireless access device to the other virtual wireless base station presence, wherein the other virtual wireless base presence provides the requested service to the wireless access device.

8. A wireless base station apparatus for providing on-demand wireless services in a service area, the apparatus comprising:
an interface that receives a request for service from a wireless access device in the service area;
a processor that executes instructions stored in memory, wherein execution of the instructions determines that no virtual wireless base station presence corresponding to the requested service is currently being provided; and
an antenna that
initiates a new virtual wireless base station presence, wherein the new virtual wireless base station presence corresponds to the requested service, and
broadcasts a plurality of beacon frames that indicate the availability of the requested service to one or more other wireless access devices in the service area, whereby the requested service is made available via the new virtual wireless base station presence to the one or more wireless access devices upon subscription by the wireless access device, and terminates provisioning of the requested service after the processor arrives at a determination that no subscribing wireless access device remains within the service area.

9. The wireless base station apparatus of claim 8, further comprising a memory that stores a list of valid services in memory and wherein the processor further executes instructions to determine that the requested service corresponds to a valid service on the list prior to initiating the new virtual wireless base station presence.

10. The wireless base station apparatus of claim 8, wherein the processor further executes instructions to authenticate the wireless access device within a predetermined period of time following receipt of the request and prior to initiating the new virtual wireless base station presence.

11. The wireless base station apparatus of claim 10, wherein the processor further executes instructions to group the wireless access device according to provided authentication credentials, and wherein the group is associated with a set of available services.

12. The wireless base station apparatus of claim 8, wherein the processor further executes instructions to determine that a maximum number of virtual wireless base station presences has not been reached prior to initiating the new virtual wireless base station presence.

13. The wireless base station apparatus of claim 8, wherein the termination of the virtual wireless base station presence allows for initiation of another new virtual wireless base station presence corresponding to another requested service.

14. The wireless base station apparatus of claim 8, wherein the processor further executes instructions to:
   identify a degradation in signal quality between the new virtual wireless base station presence and the wireless access device; and
   determine that the degraded signal quality is less than the signal quality of another virtual wireless base station presence; and
   transitions the wireless access device to the other virtual wireless base station presence, and wherein the other virtual wireless base presence continues to provide the requested service to the wireless access device.

15. A non-transitory computer-readable storage medium having embodied thereon a program executable by a processor to perform a method for providing on-demand wireless services, the method comprising:
   receiving a request for service from a wireless access device in a service area of a physical wireless base station;
   determining that no virtual wireless base station presence corresponding to the requested service is currently provided by the physical wireless base station;
   initiating a new virtual wireless base station presence at the physical wireless base station, wherein the new virtual wireless base station presence corresponds to the requested service;
   broadcasting a plurality of beacon frames that indicate the availability of the requested service to one or more other wireless access devices in the service area of the physical wireless base station, whereby the requested service is made available via the new virtual wireless base station presence to the one or more wireless access devices upon subscription; and
   terminating the new virtual wireless base station presence after arriving at a determination that no subscribing wireless access device remains within the service area of the physical wireless base station.

16. The non-transitory computer-readable storage medium of claim 15, the program further executable for determining that the requested service corresponds to a valid service on a list of valid services prior to initiating the new virtual wireless base station presence.

17. The non-transitory computer-readable storage medium of claim 15, the program further executable for authenticating the wireless access device within a predetermined period of time following receipt of the request and prior to initiating the new virtual wireless base station presence.

18. The non-transitory computer-readable storage medium of claim 17, the program further executable for grouping the wireless access device according to provided authentication credentials, wherein the group is associated with a set of available services.

19. The non-transitory computer-readable storage medium of claim 15 the program further executable for determining that the physical wireless base station has not yet reached a maximum number of virtual wireless base station presences prior to initiating the new virtual wireless base station presence.

20. The non-transitory computer-readable storage medium of claim 15, wherein the termination of the virtual wireless base station presence allows for initiation of another new virtual wireless base station presence corresponding to another requested service.

21. The non-transitory computer-readable storage medium of claim 15, the program further executable for:
   identifying a degradation in signal quality between the new virtual wireless base station presence and the wireless access device;
   determining that the degraded signal quality is less than the signal quality of another virtual wireless base station presence; and
   transitioning the wireless access device to the other virtual wireless base station presence, wherein the other virtual wireless base presence continues to provide the requested service to the wireless access device.

* * * * *